US012720158B2

(12) United States Patent
Lee et al.

(10) Patent No.: US 12,720,158 B2
(45) Date of Patent: Aug. 25, 2026

(54) WIRELESS DEVICE

(71) Applicant: LG ELECTRONICS INC., Seoul (KR)

(72) Inventors: Eunjung Lee, Seoul (KR); Byounghyun Shin, Seoul (KR); Kyungnam Bae, Seoul (KR); Hyojeong Jeong, Seoul (KR); Jeonghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 18/566,974

(22) PCT Filed: Jun. 29, 2021

(86) PCT No.: PCT/KR2021/008140
§ 371 (c)(1),
(2) Date: Dec. 4, 2023

(87) PCT Pub. No.: WO2023/277208
PCT Pub. Date: Jan. 5, 2023

(65) Prior Publication Data

US 2024/0276063 A1 Aug. 15, 2024

(51) Int. Cl.

*H04N 21/4402* (2011.01)
*G06F 3/14* (2006.01)
*H04L 65/403* (2022.01)

(52) U.S. Cl.

CPC ... *H04N 21/440263* (2013.01); *G06F 3/1454* (2013.01); *H04L 65/403* (2013.01)

(58) Field of Classification Search

CPC .......... H04N 21/440263; G06F 3/1454; H04L 65/403

See application file for complete search history.

(56) References Cited

U.S. PATENT DOCUMENTS

2011/0130853 A1 6/2011 Han
2015/0097757 A1 4/2015 Bang et al.
(Continued)

FOREIGN PATENT DOCUMENTS

KR 1020110060464 6/2011
KR 1020170083796 7/2017
(Continued)

OTHER PUBLICATIONS

PCT International Application No. PCT/KR2021/008140, International Search Report dated Mar. 17, 2022, 2 pages.

*Primary Examiner* — Joshua D Taylor
(74) *Attorney, Agent, or Firm* — LEE, HONG, DEGERMAN, KANG & WAIMEY

(57) ABSTRACT

A wireless device for providing a screen sharing service with an external apparatus according to an embodiment of the present invention comprises: a wireless communication unit for receiving an image signal corresponding to a source image that the external apparatus is displaying: a display unit for displaying a mirroring image on the basis of the image signal; and a processor for controlling the display unit and the wireless communication unit. The processor can receive, from the external apparatus, a first message inquiring about support for an image quality setting function for the image being displayed by the external apparatus, and transmit a second message to the external apparatus in response to the first message, wherein the second message includes a response to the inquiry about whether the image setting function is supported.

8 Claims, 17 Drawing Sheets

(56) References Cited

U.S. PATENT DOCUMENTS

| | | | |
|---|---|---|---|
| 2017/0199715 | A1 | 7/2017 | Manchinasetti et al. |
| 2018/0176505 | A1* | 6/2018 | Byun .................... H04N 7/0127 |
| 2019/0065062 | A1 | 2/2019 | Knauft et al. |
| 2019/0196717 | A1 | 6/2019 | Prestigiacomo et al. |
| 2021/0195285 | A1* | 6/2021 | Lee .................. H04N 21/23103 |
| 2023/0298539 | A1* | 9/2023 | Wang ..................... G09G 5/006<br>345/520 |

FOREIGN PATENT DOCUMENTS

| | | |
|---|---|---|
| KR | 1020180069576 | 6/2018 |
| KR | 102087987 | 3/2020 |

* cited by examiner

FIG. 11

1110
180_1
100_1
first video signal of afterimage compensation setting status
180_2
100_2
1130

100_2 second video signal of afterimage
compensation non-setting status

100_1 first video signal to which Dolby picture quality is applied

| No. | Time | Source | Destination | Protocol | Length | p2p | Powe | Info |
|---|---|---|---|---|---|---|---|---|
| 647 | 1.628837 | 192.168.49.10 | 192.168.49.1 | RTSP | 162 | | | OPTIONS * RTSP/1.0 |
| 649 | 1.629254 | 192.168.49.1 | 192.168.49.10 | RTSP | 150 | | | Reply: RTSP/1.0 200 OK |
| 650 | 1.629382 | 192.168.49.1 | 192.168.49.10 | RTSP | 141 | | | OPTIONS * RTSP/1.0 |
| 659 | 1.634114 | 192.168.49.10 | 192.168.49.1 | RTSP | 180 | | | Reply: RTSP/1.0 200 OK |
| 666 | 1.677676 | 192.168.49.10 | 192.168.49.1 | RTSP | 390 | | | GET_PARAMETER rtsp;//localhost/wfd1.0 RTSP/1.0 |
| 668 | 1.678279 | 192.168.49.1 | 192.168.49.10 | RTSP | 563 | | | Reply: RTS[/1.0 200 OK (text/parameters) |
| 686 | 1.763432 | 192.168.49.10 | 192.168.49.1 | RTSP | 566 | | | SET_PARAMETER rtsp;//localhost/wfd1.0 RTSP/1.0 |
| 688 | 1.764602 | 192.168.49.1 | 192.168.49.10 | RTSP | 96 | | | Reply: RTSP/1.0 200 OK |
| 745 | 1.832403 | 192.168.49.10 | 192.168.49.1 | RTSP | 205 | | | SET_PARAMETER rtsp;//localhost/wfd1.0 RTSP/1.0 |
| 746 | 1.832730 | 192.168.49.1 | 192.168.49.10 | RTSP | 96 | | | Reply: RTSP/1.0 200 OK |
| 748 | 1.832897 | 192.168.49.1 | 192.168.49.10 | RTSP | 190 | | | SETUP rtsp://192.168.49.10/wfd1.0/streamid=0 RTSP/1.0 |
| 754 | 2.085067 | 192.168.49.10 | 192.168.49.1 | RTSP | 208 | | | Reply: RTSP/1.0 200 OK |

1510

Line-based text data: text/parameters (6 lines)
wfd_video_formats: 00 00 02 04 00000080 00000000 00000000 00 0000 0000 00
wfd_audio_codecs: AAC 00000001 00 \ r \ n
wfd_uibc_capability: input_category_list=GENERIC;generic_cap_list=Keyboard
wfd_uibc_setting: enable \ r \ n
wfd_presentation_URL: rtsp://192.168.49.10/wfd1.0/streamid=0 none \ r \ n
wfd_cli
wfd_lg_video_setting: brightness=100;
contrast=100; sharpness=100;
hdr=enabled; dolby=enabled

| No. | Time | Source | Destination | Protocol | Length | p2p | Powe | Info |
|---|---|---|---|---|---|---|---|---|
| 647 | 1.628837 | 192.168.49.10 | 192.168.49.1 | RTSP | 162 | | | OPTIONS * RTSP/1.0 |
| 649 | 1.629254 | 192.168.49.1 | 192.168.49.10 | RTSP | 150 | | | Reply: RTSP/1.0 200 OK |
| 650 | 1.629382 | 192.168.49.1 | 192.168.49.10 | RTSP | 141 | | | OPTIONS * RTSP/1.0 |
| 659 | 1.634114 | 192.168.49.10 | 192.168.49.1 | RTSP | 180 | | | Reply: RTSP/1.0 200 OK |
| 666 | 1.677676 | 192.168.49.10 | 192.168.49.1 | RTSP | 390 | | | GET_PARAMETER rtsp;//localhost/wfd1.0 RTSP/1.0 |
| 668 | 1.678279 | 192.168.49.1 | 192.168.49.10 | RTSP | 563 | | | Reply: RTS[/1.0 200 OK (text/parameters) |
| 686 | 1.763432 | 192.168.49.10 | 192.168.49.1 | RTSP | 566 | | | SET_PARAMETER rtsp;//localhost/wfd1.0 RTSP/1.0 |
| 688 | 1.764602 | 192.168.49.1 | 192.168.49.10 | RTSP | 96 | | | Reply: RTSP/1.0 200 OK |
| 745 | 1.832403 | 192.168.49.10 | 192.168.49.1 | RTSP | 205 | | | SET_PARAMETER rtsp;//localhost/wfd1.0 RTSP/1.0 |
| 746 | 1.832730 | 192.168.49.1 | 192.168.49.10 | RTSP | 96 | | | Reply: RTSP/1.0 200 OK |
| 748 | 1.832897 | 192.168.49.1 | 192.168.49.10 | RTSP | 190 | | | SETUP rtsp://192.168.49.10/wfd1.0/streamid=0 RTSP/1.0 |
| 754 | 2.085067 | 192.168.49.10 | 192.168.49.1 | RTSP | 208 | | | Reply: RTSP/1.0 200 OK |

1540

Line-based text data: text/parameters (6 lines)
wfd_video_formats: 00 00 02 04 00000080 00000000 00000000 00 0000 0000 00
wfd_audio_codecs: AAC 00000001 00 \ r \ n
wfd_uibc_capability: input_category_list=GENERIC;generic_cap_list=Keyboard
wfd_uibc_setting: enable \ r \ n
wfd_presentation_URL: rtsp://192.168.49.10/wfd1.0/streamid=0 none \ r \ n
wfd_cli
wfd_lg_video_setting: brightness=100;
contrast=100; sharpness=100;
hdr=disabled; dolby=disabled

1550

WIRELESS DEVICE

CROSS-REFERENCE TO RELATED APPLICATION(S)

This application is the National Stage filing under 35 U.S.C. 371 of International Application No. PCT/KR2021/008140, filed on Jun. 29, 2021, the contents of which are all incorporated by reference herein in its entirety.

TECHNICAL FIELD

This disclosure relates to wireless devices and more specifically, to wireless device that provide screen sharing service.

BACKGROUND ART

Recently, with the development of information and communication technology, various wireless communication technologies are being developed. Among these, wireless LAN (WLAN) is based on radio frequency technology and uses portable terminal such as personal digital assistant (PDA), laptop computer, and portable multimedia player (PMP) to be used at home, business, or This is a technology that allows wireless access to the Internet in a specific service area.

The introduction of Wi-Fi Direct or Wi-Fi P2P (peer-to-peer) is being discussed as a direct communication technology that allows devices to easily connect to each other without a wireless access point (AP), which is basically required in existing wireless LAN system. According to Wi-Fi Direct standard technology, devices may be connected without going through a complicated setup process, and in order to provide various services to user, it may support data exchange at the communication speed of a general wireless LAN system.

Recently, various Wi-Fi-enabled devices are being utilized, and among them, the number of devices supporting Wi-Fi Direct, allowing communication between Wi-Fi devices without the need for an access point (AP), is increasing. WFA (Wi-Fi Alliance) is currently discussing the implementation of technology that supports various services using Wi-Fi Direct links (for example, Send, Play, Display, Print, etc.) This may be called Wi-Fi Direct Service (WFDS).

Among WFDS, there is a display service that enables screen sharing between devices. Screen sharing service is also called screen mirroring technology in that wireless devices display the same image through video transmission.

The screen mirroring function is not involved in picture quality settings

As a result, when performing the mirroring function, the video, which processed the picture quality by the sending device, is transmitted, and the receiving device re-processes the received video, which may cause deterioration in the picture quality of the video output on the receiving device's screen.

DISCLOSURE

Technical Problem

The purpose of the present invention is to check whether capabilities related to picture quality setting are supported during the Miracast connection process.

The purpose of the present invention is to transmit the values of picture quality factors set by the source device when the sink device supports picture quality setting-related capability.

Technical Solution

A wireless device that provides a screen sharing service with an external device according to an embodiment of the present disclosure may receive, from the external device, a first message inquiring about support for a picture quality setting function of the video being displayed by the external device, and in response to the first message, transmit, to the external device, a second message including a response as to whether the picture quality setting function is supported.

The wireless device may receive a video signal with picture quality settings for the video from the external device when the second message includes information supporting the picture quality setting function, and display the mirrored video based on the received video signal.

Advantageous Effects

According to various embodiments of the present disclosure, when a screen sharing service is provided, a user may watch an optimal, undistorted mirroring video, regardless of whether the receiving side supports the picture quality setting function.

Accordingly, users may stably watch mirrored video without significant deterioration in picture quality.

DESCRIPTION OF DRAWINGS

FIGS. 11 and 12, when the first display device is an OLED display device and the second display device is an LCD display device, are diagrams comparing the degradation in the picture quality of mirrored video output on the second display device based on whether afterimage compensation is set for the video transmitted by the first display device.

FIGS. 13 and 14 are diagrams comparing the picture quality deterioration of the mirrored video output by the second display device whether Dolby Vision is applied to the video transmitted by the first display device when the first display device is a display device that supports Dolby Vision and the second display device is a display device that does not support Dolby Vision.

FIGS. 15A and 15B are diagrams illustrating information included in packet transmitted and received between a first display device and a second display device according to an embodiment of the present disclosure.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
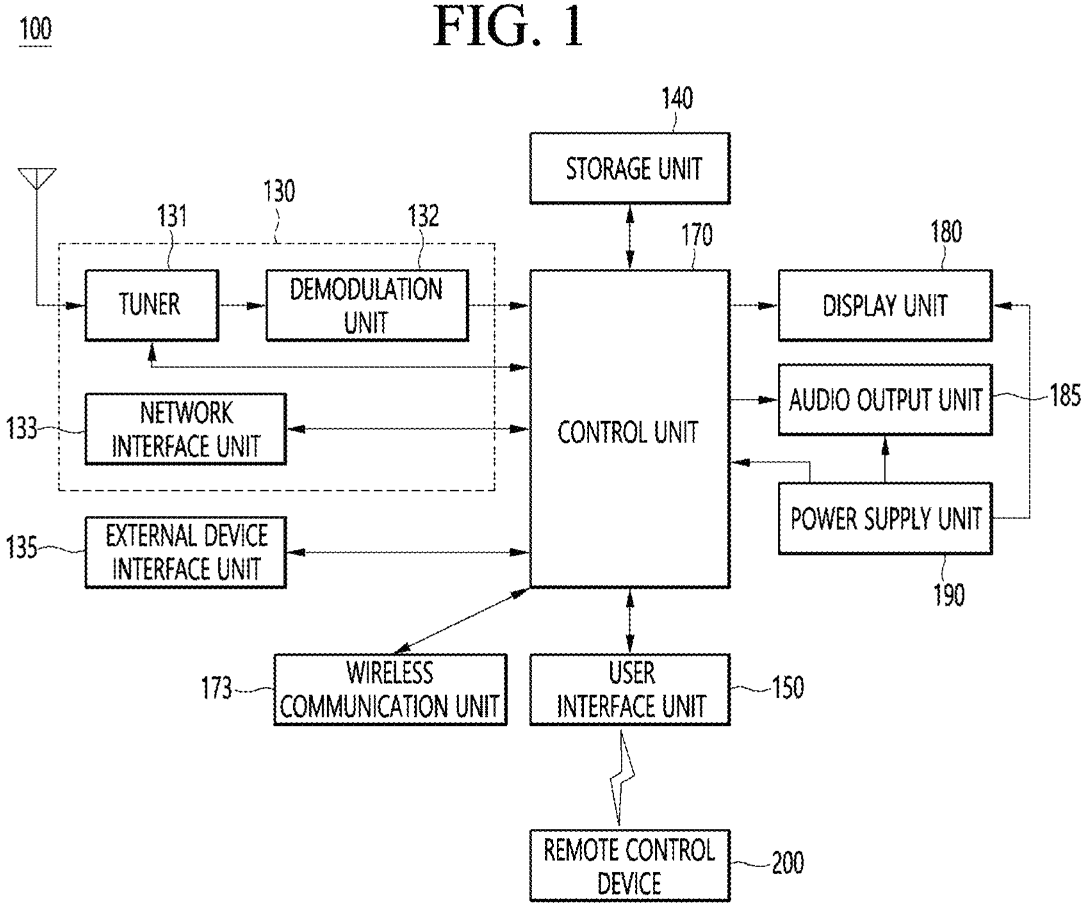
FIG. 1 is a block diagram illustrating a configuration of a display device according to an embodiment of the present disclosure.

FIG. 1 is a block diagram illustrating a configuration of a display device according to an embodiment of the present invention.

Referring to FIG. 1, a display device 100 may include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list in an adjacent external device and deliver it to the control unit 170 or the storage unit 140.

The external device interface unit 135 may provide a connection path between the display device 100 and an external device. The external device interface unit 135 may receive at least one an image or audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

A video signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system, but this is just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface unit 133 may access a predetermined webpage through an accessed network or another network linked to the accessed network. That is, the network interface unit 133 may transmit or receive data to or from a corresponding server by accessing a predetermined webpage through the network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an Internet or content provider or a network operator.

The network interface unit 133 may select and receive a desired application among applications open to the air, through network.

The storage unit 140 may store signal-processed image, voice, or data signals stored by a program in order for each signal processing and control in the control unit 170.

Additionally, the storage unit 140 may perform a function for temporarily storing image, voice, or data signals output from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (for example, video files, still image files, music files, document files, application files, and so on) stored in the storage unit 140 and provide them to a user.

The user interface unit 150 may deliver signals input by a user to the control unit 170 or deliver signals from the control unit 170 to a user. For example, the user interface unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 may deliver, to the control unit 170, control signals input from local keys (not shown) such as a power key, a channel key, a volume key, and a setting key.

Video signal that is video-processed in the control unit 170 may be input to the display unit 180 and displayed as a video corresponding to corresponding video signal. Additionally, video signal that is video-processed in the control unit 170 may be input to an external output device through the external device interface unit 135.

Voice signal processed in the control unit 170 may be output to the audio output unit 185. Additionally, voice signals processed in the control unit 170 may be input to an external output device through the external device interface unit 135.

Besides that, the control unit 170 may control overall operations in the display device 100.

Additionally, the control unit 170 may control the display device 100 by a user command or internal program input through the user interface unit 150 and download a desired application or application list into the display device 100 in access to network.

The control unit 170 may output channel information selected by a user together with processed image or voice signals through the display unit 180 or the audio output unit 185.

Additionally, according to an external device image playback command received through the user interface unit 150, the control unit 170 may output video signals or voice signals of an external device such as a camera or a camcorder, which are input through the external device interface unit 135, through the display unit 180 or the audio output unit 185.

Moreover, the control unit 170 may control the display unit 180 to display images and control broadcast images input through the tuner 131, external input images input through the external device interface unit 135, images input through the network interface unit, or images stored in the storage unit 140 to be displayed on the display unit 180. In this case, a video displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform a wired or wireless communication with an external electronic device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert video signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present invention and its specific operation or device does not limit the scope of the present invention.

According to another embodiment of the present invention, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present invention described below may be performed by one of the display device described with reference to FIG. 1, an image processing device such as the separated set-top box, and a content playback device including the display unit 180 and the audio output unit 185.

Figure 2:
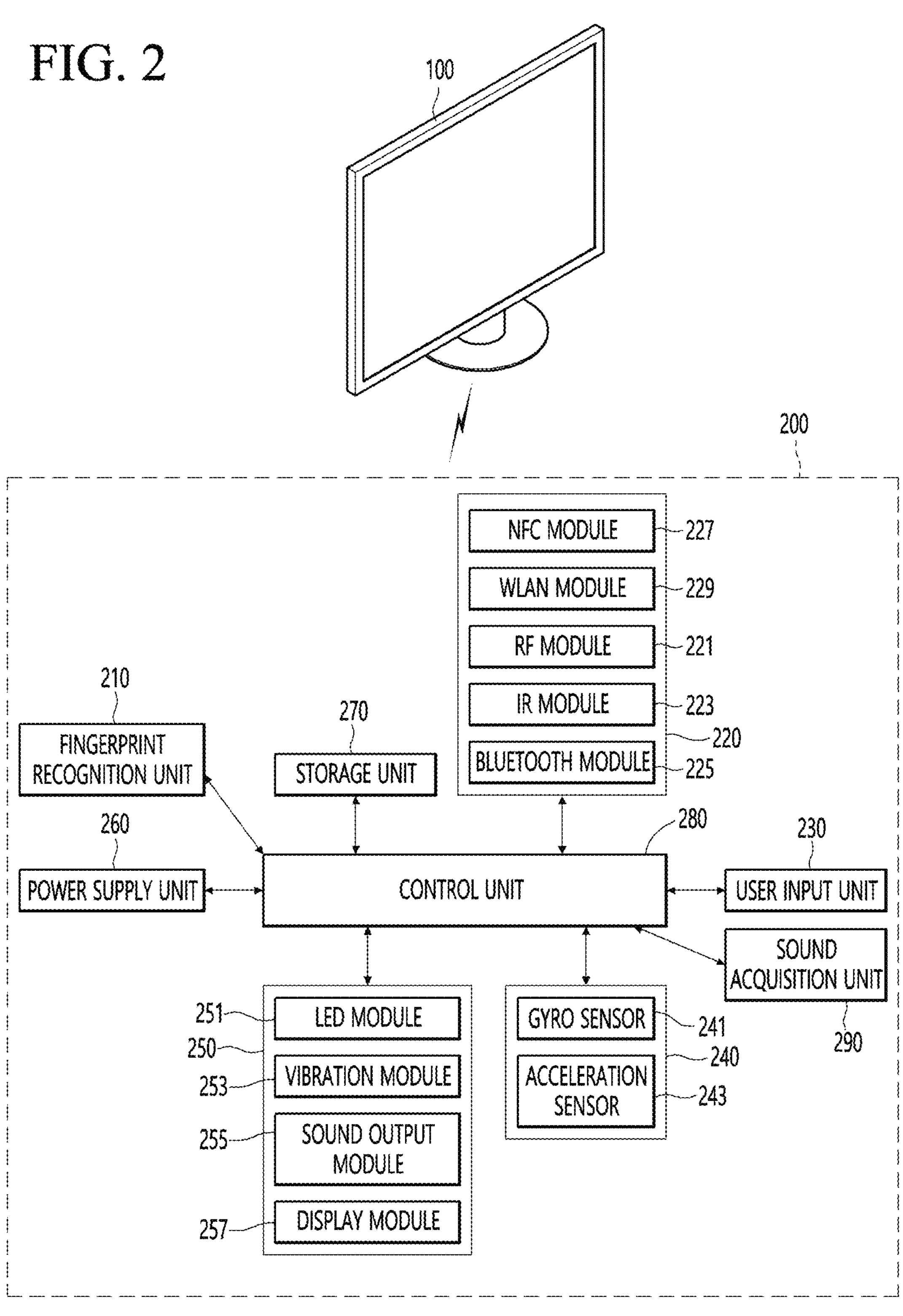
FIG. 2 is a block diagram illustrating a remote control device according to an embodiment of the present invention.
Figure 3:
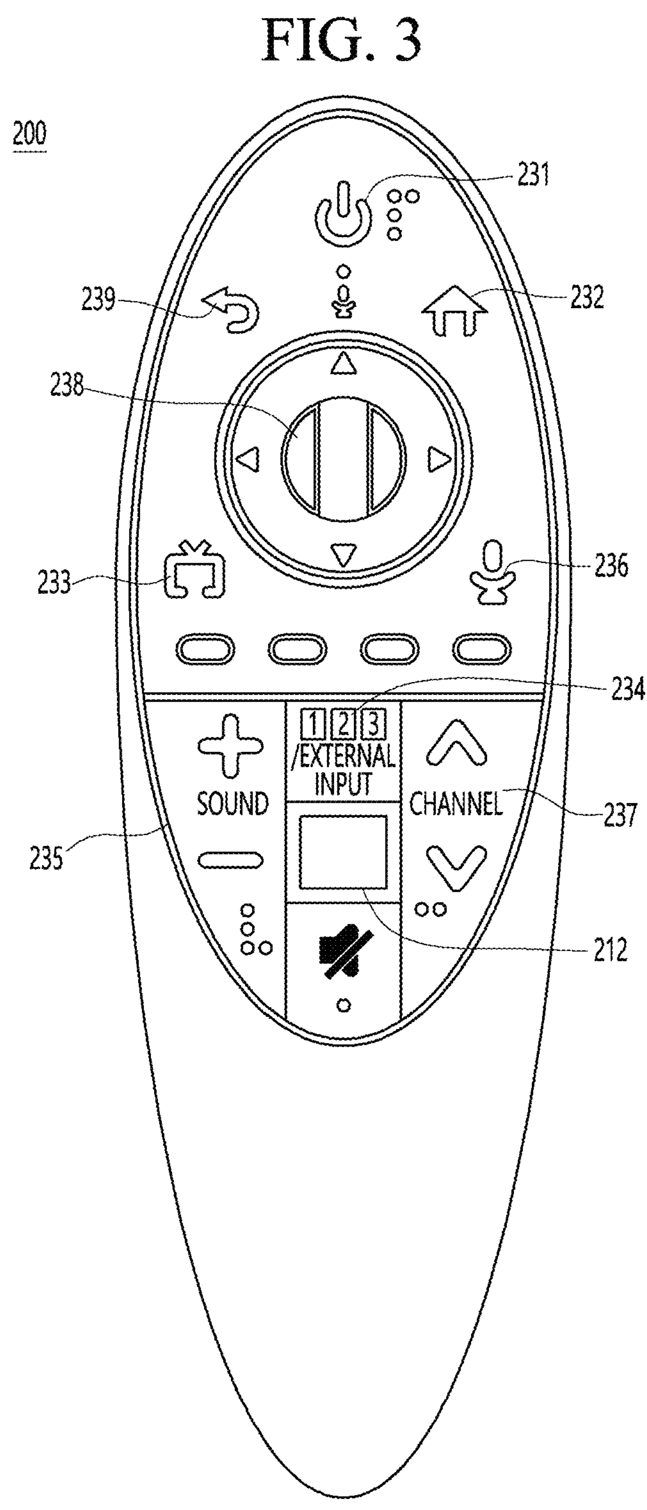
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standard. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present invention, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 will be described.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present invention.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 230 or image or voice signals corresponding to signals transmitted from the display device 100. A user may recognize whether the user input unit 230 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to control of the remote control device 200. The control unit 280 may transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 may obtain voice.

The sound acquisition unit 290 may include at least one microphone and obtain voice through the microphone 291.

Next, FIG. 4 will be described.

Figure 4:
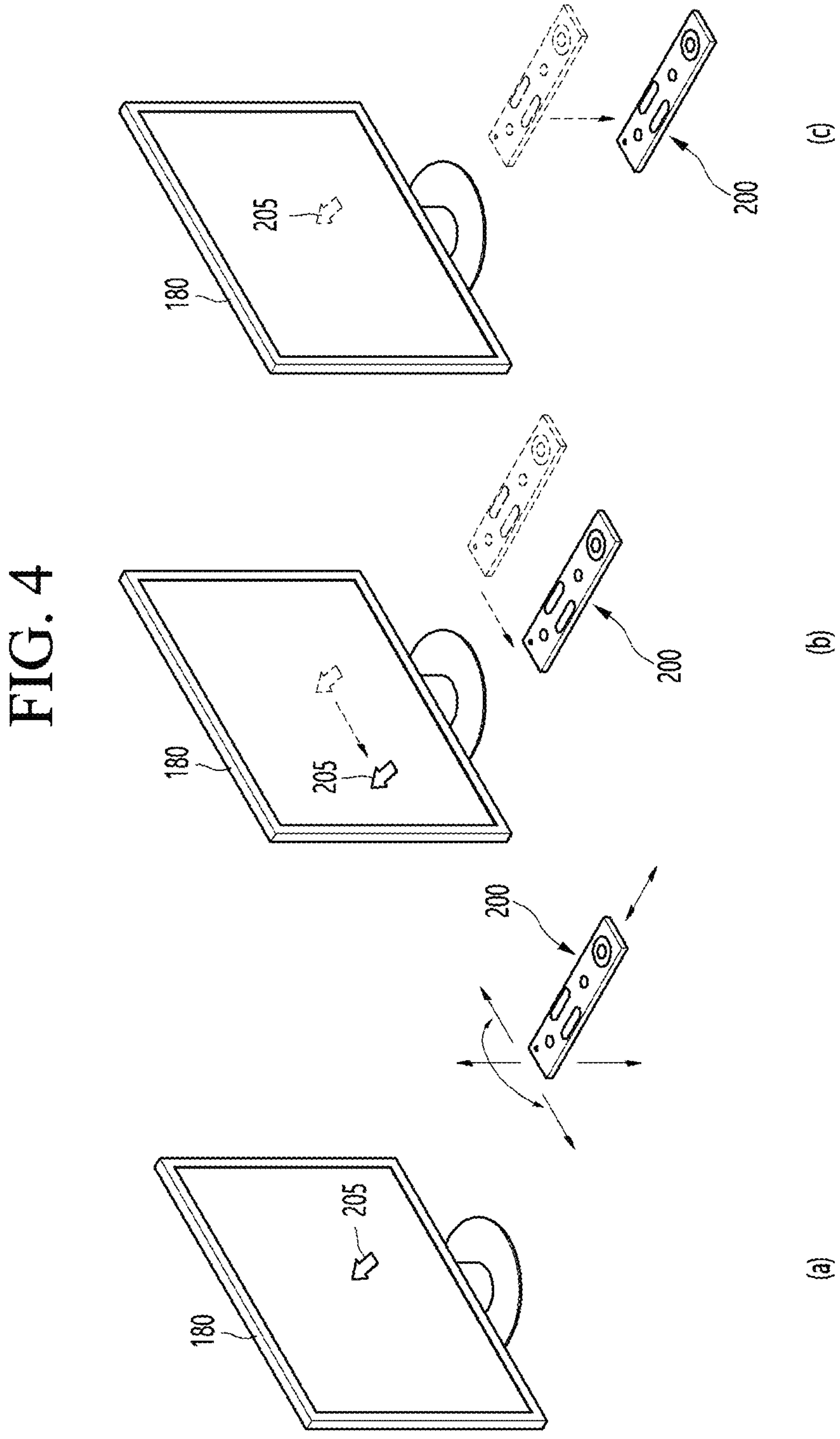
FIG. 4 is a view of utilizing a remote control device according to an embodiment of the present invention.

FIG. 4 is a view of utilizing a remote control device according to an embodiment of the present invention.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 may be zoomed in and displayed larger.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
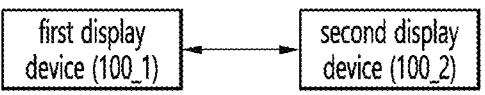
FIG. 5 is a diagram explaining the configuration of a wireless display system according to an embodiment of the present disclosure.

FIG. 5 is a diagram explaining the configuration of a wireless display system according to an embodiment of the present disclosure.

The wireless display system may include a first display device 100_1 and a second display device 100_2.

Each of the first display device 100_1 and the second display device 1002 may include all of the components shown in FIG. 1.

The first display device 100_1 may be a WFD source, which will be described later, and the second display device 100_2 may be a WFD sink, which will be described later.

The first display device 100_1 may provide a mirroring service with the second display device 100_2.

The first display device 100_1 may wirelessly transmit video data for the video which is displaying to the second display device 100_2.

In this case, the Wi-Fi Direct standard may be used to transmit video data.

Next, with reference to FIG. 6, an example in which a screen sharing service is provided by establishing a WFD session between a WFD source and a WFD sink will be described.

Figure 6:
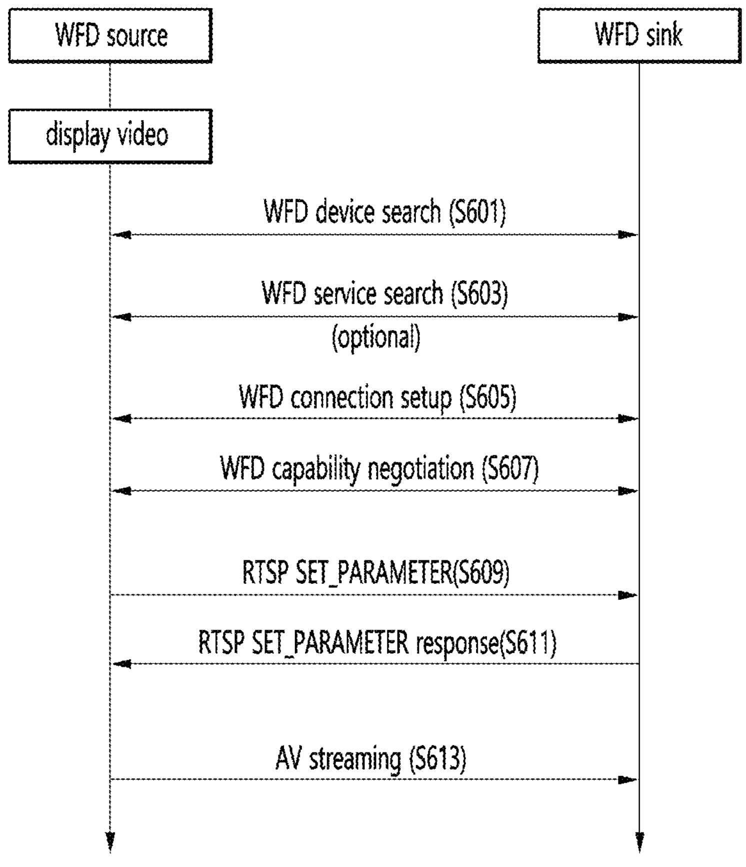
FIG. 6 is a ladder diagram to explain the process in which a screen sharing service is provided by establishing a WFD session between a WFD source and a WFD sink according to an embodiment of the present invention.

FIG. 6 is a ladder diagram to explain the process in which a screen sharing service is provided by establishing a WFD session between a WFD source and a WFD sink according to an embodiment of the present invention.

One or more of the steps in FIG. 6 may be supported by the Wi-Fi Direct standard document.

Among WFDS, display service may refer to service and application that enable screen sharing between P2P devices. A P2P service that uses a display service may be called a WFD device, and among WFD devices, a device that supports streaming of multimedia content through a device P2P link is a Wi-Fi display (WFD) source, and a device receives and renders multimedia content from a WFD source device through a P2P link that may be referred to as a WFD sink.

The WFD source 10 may be the mobile terminal 500 shown in FIG. 5. Accordingly, the WFD source 10 may include all components of the mobile terminal 500 shown in FIG. 5.

The WFD sink 20 may be the display device 100 shown in FIG. 1. Accordingly, the WFD sink 20 may include all components of the mobile terminal 500 shown in FIG. 1.

Referring to FIG. 6, the WFD source 10 may display an image on the screen (S600).

In one embodiment, the video displayed on the screen may be a video of media content.

In another embodiment, when the WFD source 10 is the mobile terminal 500 shown in FIG. 5, the video displayed on the screen is the home screen of the mobile terminal 500 and the execution screen of an application installed on the mobile terminal 500. etc., it may be an image that the mobile terminal 500 is displaying.

Thereafter, the WFD source 10 and the WFD sink 20 may first search each other's existence prior to setting up the WFD connection through WFD Device Discovery (S601). Specifically, WFD devices may recognize each other's presence through a probe request frame and probe response frame that include a WFD Information Element (WFD IE). The WFD information element may include basic information for establishing optimal connections between WFD devices, such as device type and device status. When the WFD device receives a probe request frame including the WFD IE, it may transmit a probe response frame including its own WFD IE in response. If a WFD device is linked to an AP and operates as a Wi-Fi P2P device, two or more Wi-Fi transceivers logically operate in one physical device. At this time, the Wi-Fi Direct transceiver is used to discover the WFD device. A probe request frame for discovery of a WFD device may include not only the WFD IE but also a P2P information element (IE), which may be decoded by the Wi-Fi Direct transceiver.

Afterwards, the WFD source 10 and the WFD sink 20 may explore each other's service capabilities prior to setting up the WFD connection (S603). Specifically, when one WFD device transmits a service discovery request frame including the WFD capability as an information sub-element, the other WFD device may transmit a service discovery request frame including its WFD capability as an information sub-element in response. The service discovery procedure is an optional procedure, and a WFD device that supports the service discovery procedure may perform the service discovery procedure with a discovered WFD device that supports the service discovery procedure. To perform a service discovery procedure, the probe request frame and response frame used in the device discovery procedure may include information indicating whether the WFD device has the ability to support the service discovery procedure.

Thereafter, the WFD source 10 or the WFD sink 20 may select a peer WFD device for WFD connection setup. The peer WFD device that will proceed with WFD connection setup may be selected based on the user's input, or the peer WFD device that will automatically proceed with WFD connection setup may be selected according to policy.

Afterwards, the WFD device may select a WFD connection setup method with the selected peer WFD device (S605). Specifically, WFD device may establish a WFD connection with either Wi-Fi P2P or TDLS (Tunneled Direct Link Setup) connectivity scheme. WFD device may determine the connection scheme based on a preferred connection (Preferred connectivity) and the associated BSSID sub-element delivered with WFD information element.

If WFD setup is successfully performed using Wi-Fi P2P or TDLS between WFD devices, the WFD device may proceed with WFD capability negotiation (S607). Specifically, the WFD source 10 and the WFD sink 20 exchange messages using the RTSP (Real-Time Streaming Protocol) protocol to determine a parameter set that defines the audio/video payload during the WFD session. The WFD source 10 and the WFD sink 20 may exchange their specification information with each other.

The WFD source 10 may inquire about the capability of the WFD sink 20 using the RTSP protocol, and the WFD sink 20 may transmit its capability information to the WFD source 10 in response. For example, the WFD sink 20 may transmit resolution information including supportable resolutions to the WFD source 10. For example, the WFD sink 20 may transmit, to the WFD source 10, resolution information including a resolution that the WFD sink 20 may support, including a resolution corresponding to an aspect ratio of 16:9 or 4:3. Here, the resolution corresponding to 16:9 or 4:3 is only an example, and may be a resolution corresponding to a screen ratio in which the horizontal length is longer than the vertical length.

Conversely, the WFD source 10 may also transmit resolution information including supportable resolutions to the WFD sink 20.

During the WFD capability negotiation process with the WFD sink 20, the WFD source 10 may transmit a necessary request message to the WFD sink 20 using the RTSP protocol (S609). For example, the WFD source 10 may transmit a message containing the content of delivering an image of video content corresponding to a specific resolution based on the resolution information received from the WFD sink 20 using the RTSP protocol. More specifically, the WFD source 10 may select one of a plurality of resolutions that the WFD sink 20 may support, and transmit a message to the WFD sink 20 to transmit an image of video content with the selected resolution. That is, the WFD source 10 may select one of a plurality of resolutions and transmit a message indicating that it will transmit an image of the selected resolution to the WFD sink 20.

The WFD sink 20 may transmit a response message through the RTSP protocol based on the request message received from the WFD source 10 (S611).

In one embodiment, the resolution selected by the WFD source 10 may not be included in resolutions that the WFD source 10 may support. That is, the resolution of the video being displayed by the WFD source 10 may not be included in resolutions that the WFD sink 20 may support. Steps S609 and S611 may be included in the WFD capability negotiation step (S607).

When the WFD capability negotiation phase is successfully completed, a WFD session (or Miracast session) is established between the WFD source 10 and the WFD sink 20, and audio and video content may be streamed from the WFD source 10 to the WFD sink 20 (S613).

In one embodiment, the WFD sink 20 may display the entire image of streamed video content.

In the drawings below, it is assumed that the WFD source 10 may be the mobile terminal 500 described in FIG. 5, and the WFD sink 20 may be the display device 100 described in FIG. 1.

Accordingly, the WFD source 10 may include all components of the mobile terminal 500 shown in FIG. 5. Likewise, the WFD sink 20 may also include all components of the display 100 shown in FIG. 1.

Figure 7:
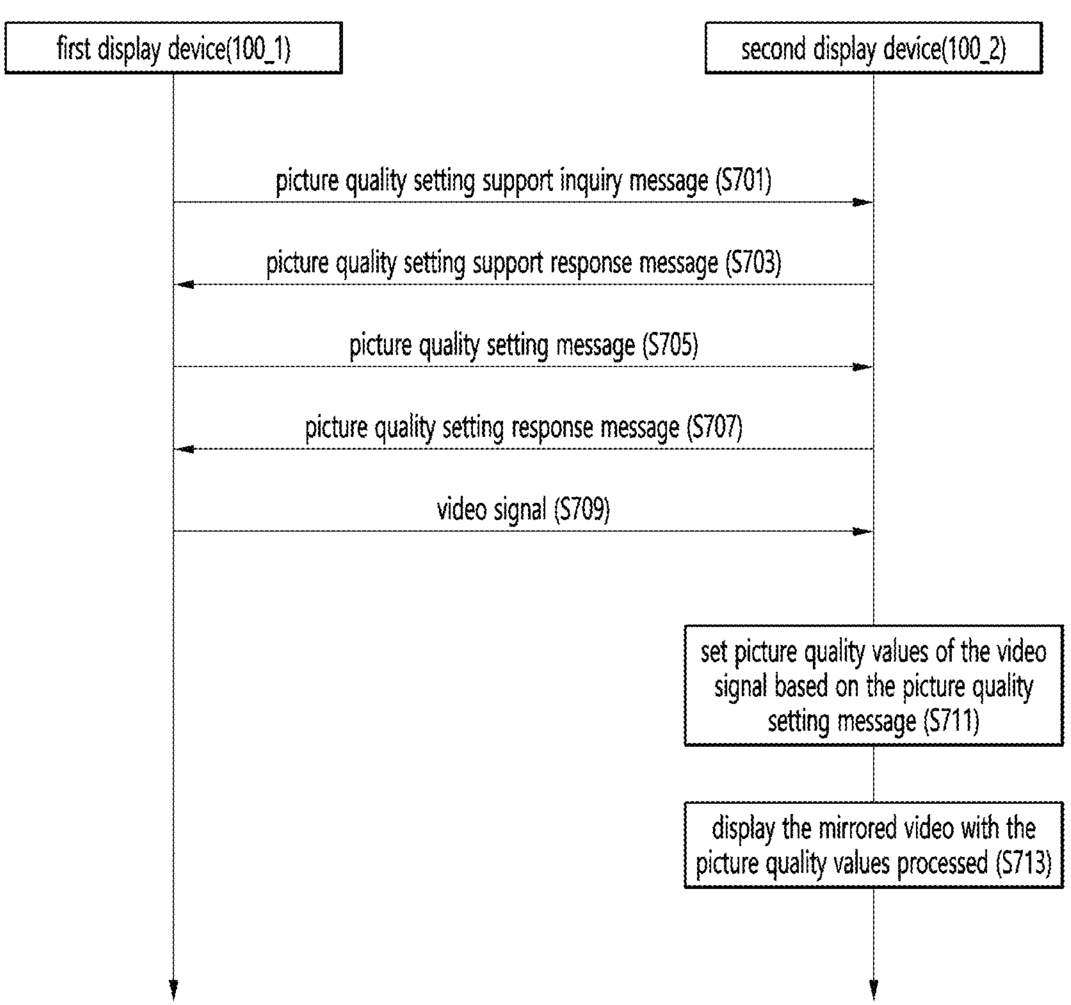
FIGS. 7 to 8B are ladder diagrams for explaining an operation method of a wireless display system according to an embodiment of the present disclosure.
Figure 8A:
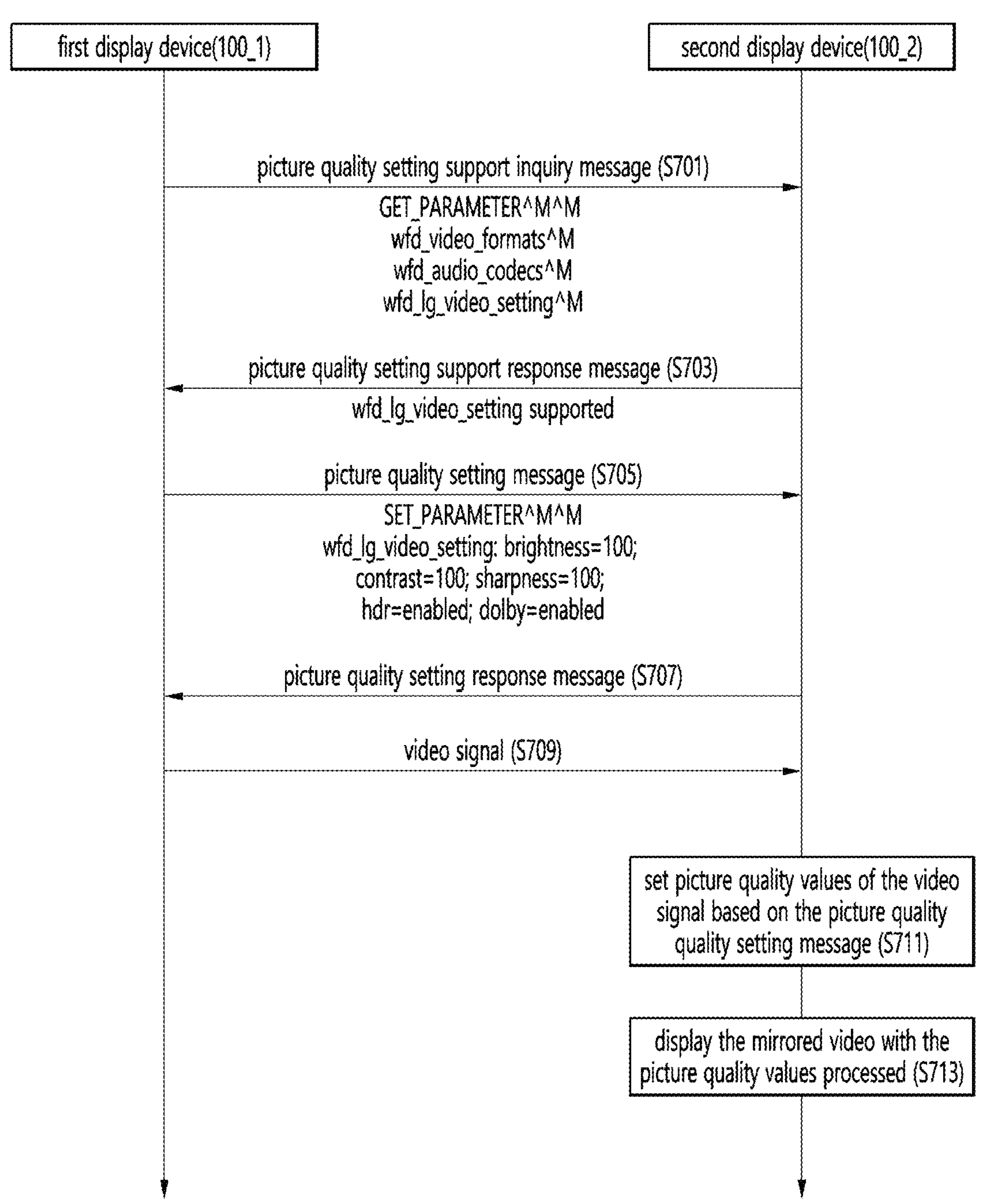
Figure 8B:
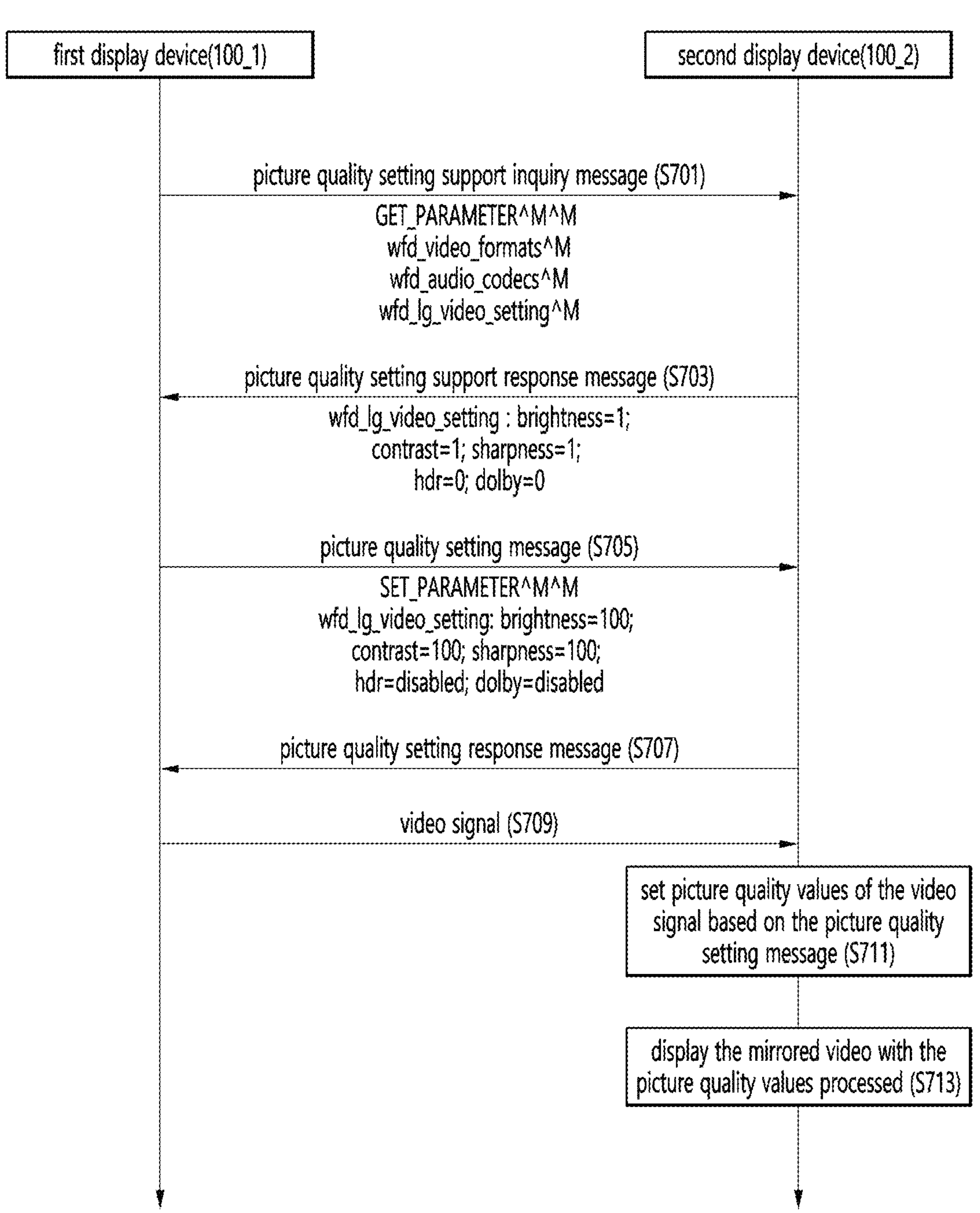

FIGS. 7 to 8B are ladder diagrams for explaining an operation method of a wireless display system according to an embodiment of the present disclosure.

FIGS. 7 to 8B, the first display device 1001 may be a WFD sink described in FIG. 6, and the second display device 100_2 may be a WFD source.

It is assumed that the WFD setup described in FIG. 6 has been performed for the first display device 100_1 and the second display device 100_2.

Additionally, in FIGS. 7 to 8B, it is assumed that the second display device 100_2 is a device that supports a picture quality setting function for video for mirroring. The picture quality setting function may be a function that allows correction of the picture quality of the video transmitted by the first display device 100_1, which is the source device, for mirroring.

The control unit 170 of the second display device 100_2 receives a picture quality setting support inquiry message from the first display device 100_1 through the wireless communication unit 173 (S701).

The picture quality setting support inquiry message may be a message inquiring whether the second display device 100_2 supports the picture quality setting function.

In other words, the picture quality setting support inquiry message may be a message inquiring whether the second display device 100_2 has the capability of the picture quality setting function.

The picture quality setting support inquiry message may be expressed as GET_PARAMETER^M^M, as shown in FIG. 8.

The picture quality setting support inquiry message may include a picture quality setting function support field (wfd_lg_video_setting^M). The picture quality setting support inquiry message may further include a supported resolution field (wfd_video_formats^M) and a supported audio codec field (wfd_audio_codecs^M).

In response to the picture quality setting support inquiry message, the control unit 170 of the second display device 100_2 transmits a picture quality setting support response message to the first display device 100_1 through the wireless communication unit 173 (S703).

In response to the picture quality setting support inquiry message, the control unit 170 of the second display device 100_2 may transmit a picture quality setting support response message including information indicating whether the picture quality setting function is supported to the first display device 100_1.

As shown in FIG. 8A, the picture quality setting support response message may include a picture quality setting function support field (wfd_lg_video_setting), and if the field value is supported, it may be interpreted as supporting the picture quality setting function.

In another embodiment, the picture quality setting support response message may include information indicating that the setting function of some picture quality factors is supported, as shown in FIG. 8B.

For example, if the brightness value, contrast value, and sharpness value of the picture quality setting function support field (wfd_lg_video_setting) are each 1, and the HDR value and Dolby value are 0, the second display device 100_2 may set picture quality factors as like the brightness, contrast, sharpness and it may indicate that HDR video and Dolby Vision are not supported.

In this way, the second display device 1002 may notify that it may support setting of some picture quality factors through a picture quality setting support response message.

Steps S701 and S703 may be included in the capability negotiation step of step S607 of FIG. 6.

Step S701 may correspond to step S609 of FIG. 6, and step S703 may correspond to step S611 of FIG. 6.

Afterwards, the control unit 170 of the second display device 100_2 receives a picture quality setting message from the first display device 100_1 through the wireless communication unit 173 (S705).

When the first display device 100_1 confirms that the second display device 100_2 supports the picture quality setting function, the first display device 1001 may transmit a picture quality setting message including picture quality setting information to the second display device 100_2.

Picture quality setting information may be information that includes values for a plurality of picture quality factors in a video for mirroring.

A plurality of picture quality factors may include brightness, contrast, sharpness, HDR video, and Dolby Vision.

The picture quality setting message may be expressed as SET_PARAMETER^M^M, as shown in FIGS. 8A and 8B.

As shown in FIGS. 8A and 8B, the picture quality setting message may include brightness value, contrast value, sharpness, whether it is an HDR video, and whether Dolby Vision is supported.

hdr=enabled may indicate that the video to be transmitted is an HDR video. hdr=disabled may indicate that the video to be transmitted is not an HDR video.

dolby=enabled may indicate that Dolby Vision is applied to the video to be transmitted.

dolby=disabled may indicate that Dolby Vision is not applied to the video to be transmitted.

Dolby Vision may be a video transmission standard that adds dynamic metadata to HDR video. In Dolby Vision, for each scene, the value of the picture quality factor for depicting the scene may be determined.

As in the embodiment of FIG. 8A, the first display device 1001 may transmit values for setting brightness, contrast, sharpness, HDR image, and Dolby Vision to the second display device 100_2 through a picture quality setting message. The second display device 100_2 may set the picture quality values of the video signal that is the target of mirroring based on the picture quality setting message.

As in the embodiment of FIG. 8B, the first display device 100_1 sets the values of some factors (brightness, contrast, and sharpness) among brightness, contrast, sharpness, HDR image, and Dolby Vision to the second display device 1001 through a picture quality setting message. It may be transmitted to the display device 100_2. The second display device 100_2 may set the brightness, contrast, and sharpness of the video signal that is the target of mirroring based on the picture quality setting message.

In response to the picture quality setting message, the control unit 170 of the second display device 100_2 transmits a picture quality setting response message to the first display device 100_1 through the wireless communication unit 173 (S707).

The picture quality setting response message may be a response message indicating that the picture quality setting message has been received. That is, the picture quality setting response message may be an Ack message.

Steps S705 and S707 may be included in the capability negotiation step of step S607 of FIG. 6.

Step S705 may correspond to step S609 of FIG. 6, and step S707 may correspond to step S611 of FIG. 6.

The control unit 170 of the second display device 100_2 receives a video signal corresponding to the video being displayed by the first display device 100_1 from the first display device 100_1 through the wireless communication unit 173 (S709).

The control unit 170 may receive a video signal corresponding to the original video being displayed through the display unit 180 of the first display unit 100_1.

Step S709 may be a step corresponding to step S613 in FIG. 6.

The control unit 170 of the second display device 100_2 sets picture quality values of the video signal based on the picture quality information included in the picture quality setting message (S711).

The control unit 170 of the second display device 1002 may perform an image processing task of applying the brightness value, contrast value, and sharpness included in the picture quality setting message to the received video signal.

The control unit 170 of the second display device 100_2 displays the mirrored video with the picture quality values processed through the display unit 180 (S713).

Figure 9:
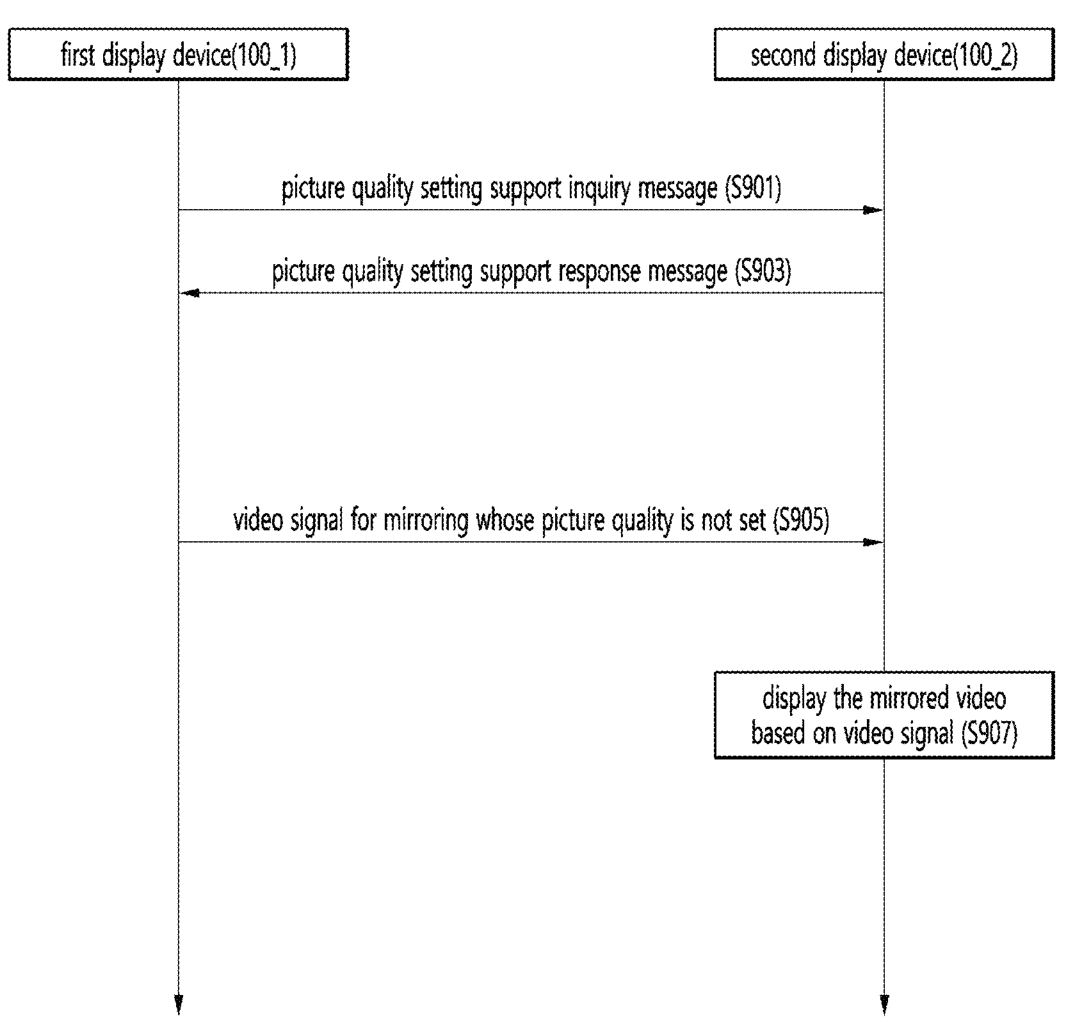
FIGS. 9 and 10 are ladder diagrams for explaining an operating method of a wireless display system according to another embodiment of the present disclosure.
Figure 10:
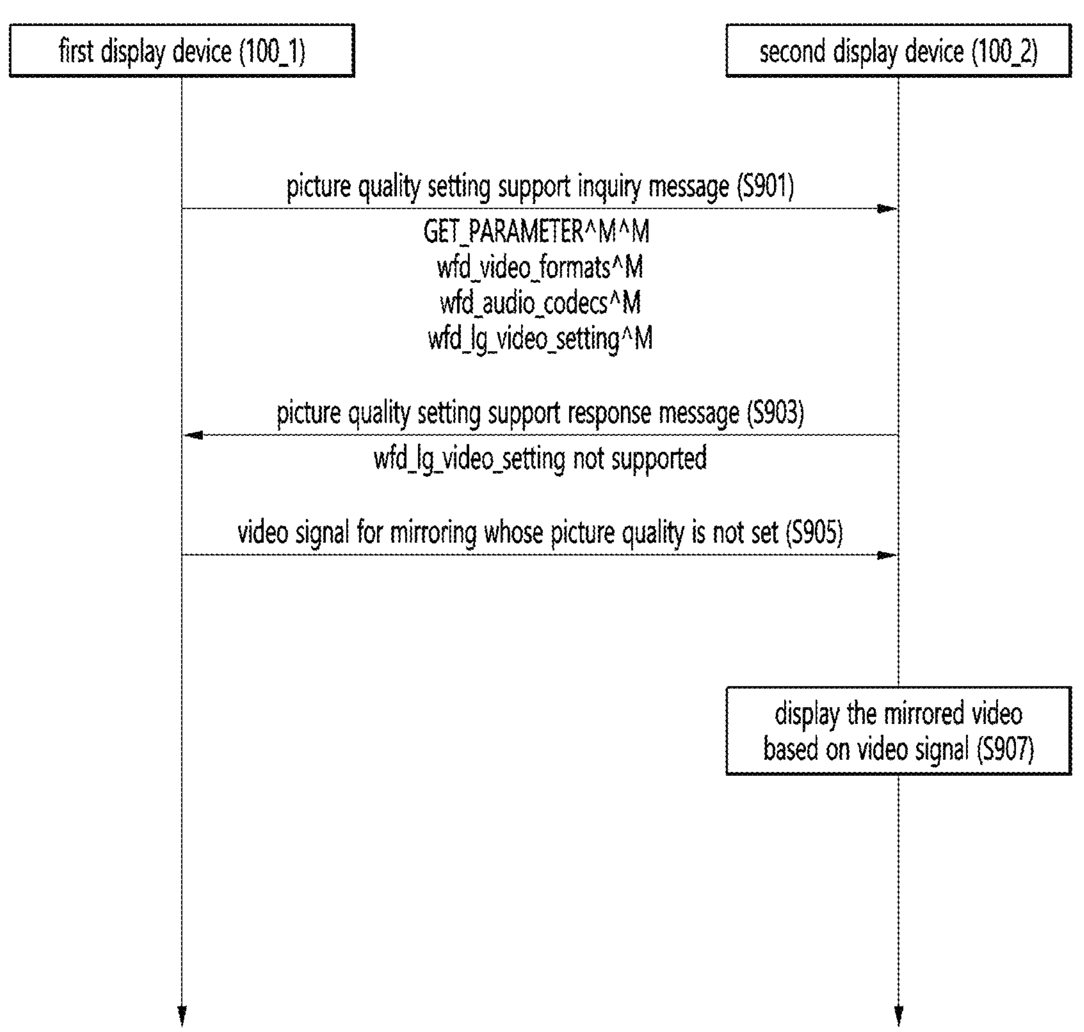

FIGS. 9 and 10 are ladder diagrams for explaining an operating method of a wireless display system according to another embodiment of the present disclosure.

FIGS. 9 and 10, the first display device 1001 may be a WFD sink described in FIG. 6, and the second display device 100_2 may be a WFD source.

It is assumed that the WFD setup described in FIG. 6 has been performed for the first display device 100_1 and the second display device 100_2.

Additionally, in FIGS. 9 and 10, it is assumed that the second display device 100_2 is a device that does not support a picture quality setting function for video for mirroring.

The control unit 170 of the second display device 100_2 receives a picture quality setting support inquiry message from the first display device 100_1 through the wireless communication unit 173 (S901).

The picture quality setting support inquiry message may be a message inquiring whether the second display device 100_2 supports the picture quality setting function.

In other words, the picture quality setting support inquiry message may be a message inquiring whether the second display device 100_2 has the capability of the picture quality setting function.

The picture quality setting support inquiry message may be expressed as GET_PARAMETER^M^M, as shown in FIG. 8.

The picture quality setting support inquiry message may include a picture quality setting function support field (wfd_lg_video_setting^M). The picture quality setting support inquiry message may further include a supported resolution field (wfd_video_formats^M) and a supported audio codec field (wfd_audio_codecs^M).

In response to the picture quality setting support inquiry message, the control unit 170 of the second display device 100_2 transmits a picture quality setting support response message to the first display device 100_1 through the wireless communication unit 173 (S903).

In response to the picture quality setting support inquiry message, the control unit 170 of the second display device 100_2 may transmit, to the first display device 100_1, a picture quality setting support response message including information indicating whether the picture quality setting function is supported.

As shown in FIG. 8, the picture quality setting support response message may include a picture quality setting function support field (wfd_lg_video_setting), and if the field value is not supported, it may be interpreted as not supporting the picture quality setting function.

Steps S901 and S903 may be included in the capability negotiation step of step S607 of FIG. 6.

Step S901 may correspond to step S609 of FIG. 6, and step S903 may correspond to step S611 of FIG. 6.

Afterwards, the control unit 170 of the second display device 100_2 receives a video signal for mirroring whose picture quality is not set from the first display device 100_1 through the wireless communication unit 173 (S905).

If the control unit 170 of the second display device 100_2 does not support the picture quality setting function, the control unit 170 of the second display device 1002 may receive a video signal in which the picture quality factor of the video signal is not set from the first display device 100_1.

For example, if the first display device 1001 supports Dolby Vision and the second display device 100_2 does not support Dolby Vision, the first display device 100_1 may transmit, to the second display device 100_2, a video signal to which Dolby Vision is not applied.

The control unit 170 of the second display device 100_2 displays a mirrored video through the display unit 180 based on a video signal for which the picture quality is not set (S907).

The control unit 170 of the second display device 100_2 may convert a video signal whose picture quality is not set to fit the resolution it supports to display the converted mirrored video through the display unit 180.

As such, according to an embodiment of the present disclosure, when providing a mirroring service, regardless of whether the second display device 1002 supports the picture quality setting function, the second display device 1002 may display the mirrored video without significant deterioration.

Figure 11:
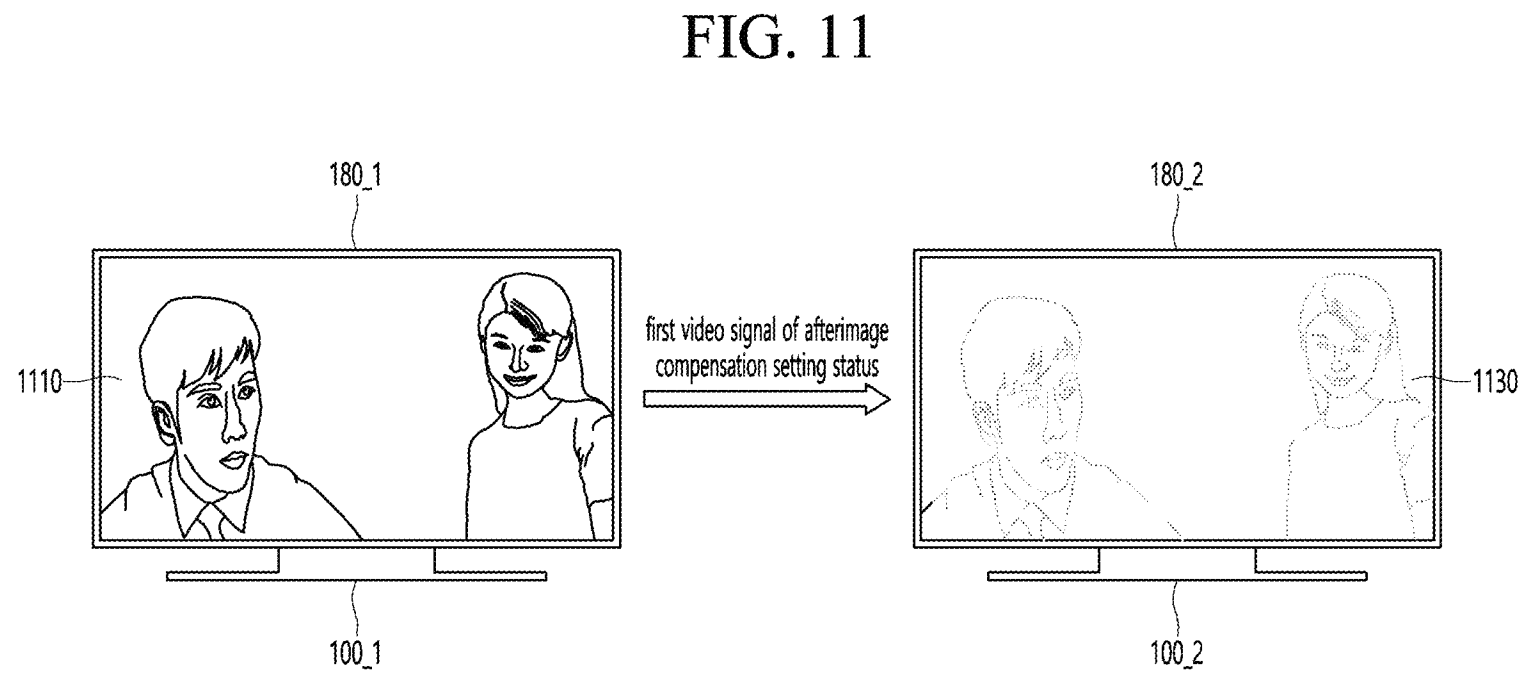
Figure 12:
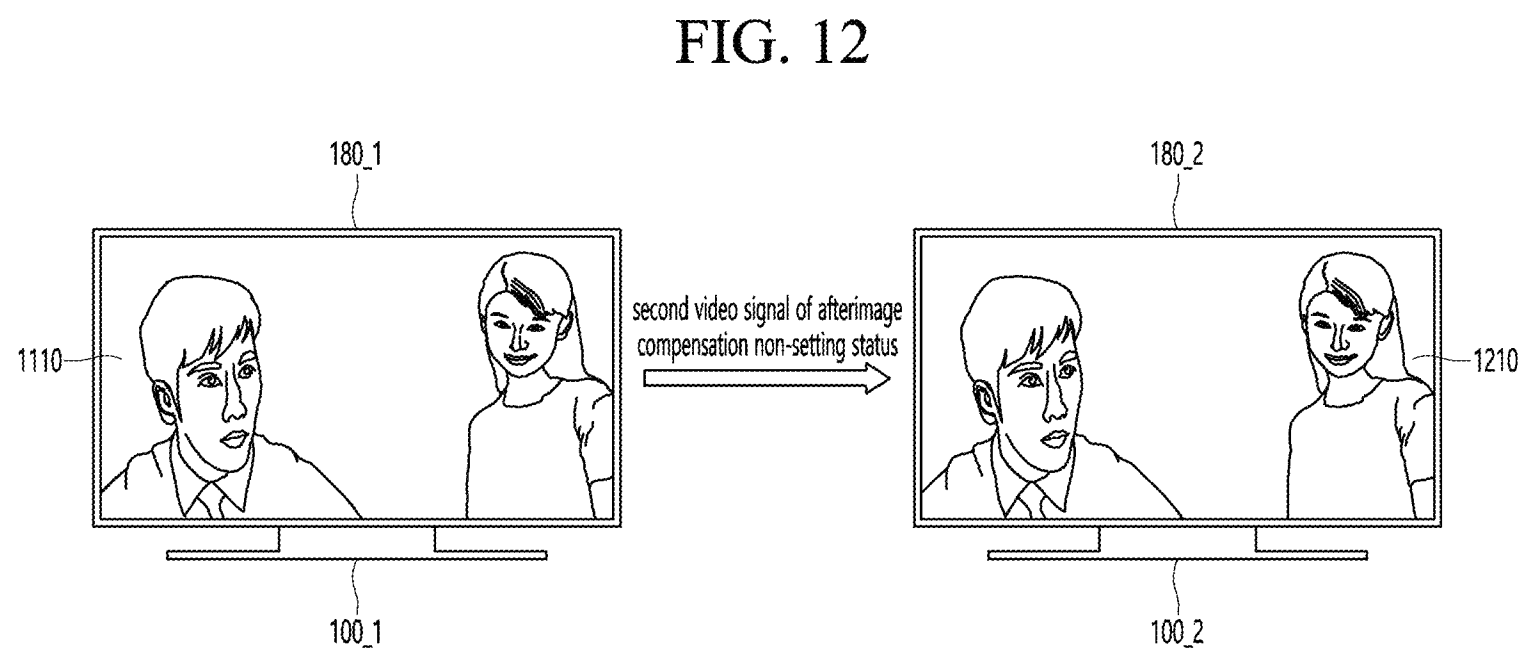

FIGS. 11 and 12, when the first display device is an OLED display device and the second display device is an LCD display device, are diagrams comparing the degradation in the picture quality of mirrored video output on the second display device based on whether afterimage compensation is set for the video transmitted by the first display device.

FIG. 11 may be a video transmission method according to the prior art, and FIG. 12 may be a video transmission method according to an embodiment of the present disclosure.

First, in FIG. 11, the first display device 1001 may transmit a first video signal on which afterimage compensation has been performed on the source video 1110 being displayed through the display unit 180_1 to the second display device 100_2. That is, the first video signal may be a signal in which the values of one or more picture quality factors according to afterimage compensation are reflected.

The second display device 100_2 receives the first video signal with afterimage compensation set, but does not support the picture quality setting function, so the values of one or more picture quality factors according to afterimage compensation may not be reflected in the first mirroring video 1130.

Accordingly, picture quality deterioration may occur in the first mirroring video 1130 displayed on the second display device 100_2.

Next, FIG. 12 will be described.

In FIG. 12, the second display device 1002 may notify the first display device 100_1 that the picture quality setting function is not supported during a capability negotiation with the first display device 100_1.

The first display device 100_1 may transmit a second video signal without performing afterimage compensation to the source image 1110 being displayed to the second display device 100_2. That is, the second video signal may be a signal in which the values of one or more picture quality factors according to afterimage compensation are not reflected.

The second display device 100_2 may display the second mirroring video 1210 on the display unit 180_2 based on the second video signal for which afterimage compensation is not set.

The degree of picture quality deterioration of the second mirroring video 1210 may be lower than that of the source image 1110, but the degree of picture quality deterioration may be much lower than that of the first mirroring video 1130 of FIG. 11.

As such, according to an embodiment of the present disclosure, even if the display type is different between the source device and the sink device, stable mirroring video output is possible as the sink device shares in advance whether or not the picture quality setting function is supported.

Figure 13:
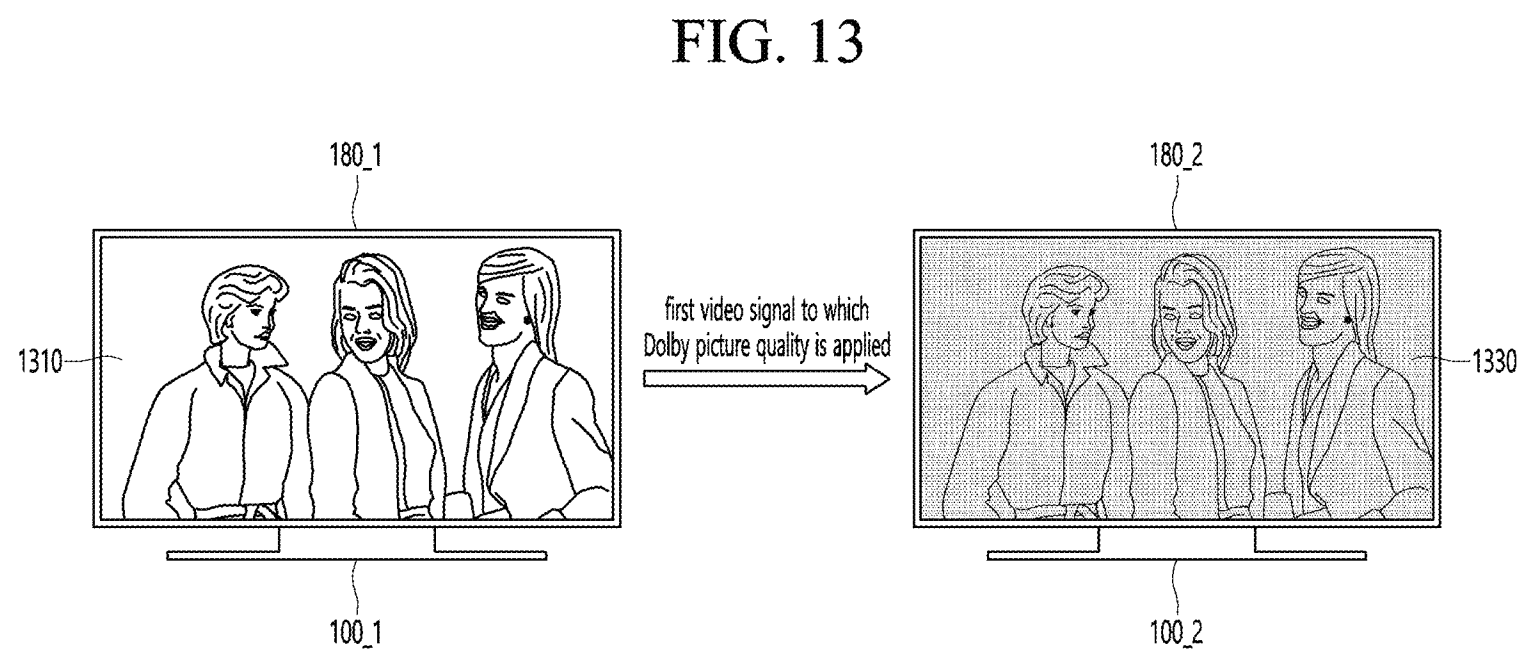
Figure 14:
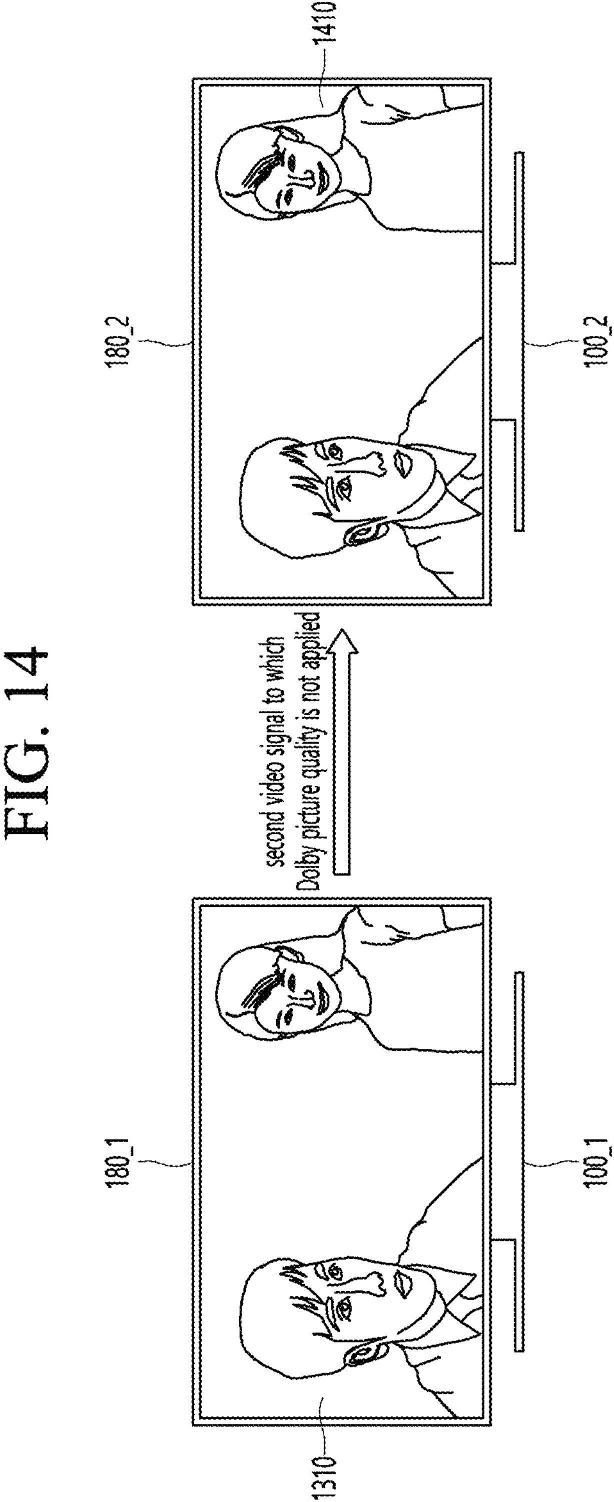

FIGS. 13 and 14 are diagrams comparing the picture quality deterioration of the mirrored video output by the second display device whether Dolby Vision is applied to the video transmitted by the first display device when the first display device is a display device that supports Dolby Vision and the second display device is a display device that does not support Dolby Vision.

FIG. 13 may be a video transmission method according to the prior art, and FIG. 14 may be a video transmission method according to an embodiment of the present disclosure.

First, in FIG. 13, the first display device 100_1 may transmit, to the second display device 1002, a first video signal to which Dolby picture quality, a type of picture quality standard, is applied to the source image 1310 being displayed through the display unit 180_1. That is, the first video signal may be a signal that reflects the values of one or more picture quality factors according to Dolby Vision.

Since the second display device 100_2 does not support Dolby Vision video, the values of one or more picture quality factors according to Dolby picture quality cannot be reflected in the first mirroring video 1330.

Accordingly, picture quality deterioration, such as artifact may occur in the first mirroring video 1330 displayed on the second display device 100_2.

In FIG. 14, the second display device 1002 may notify the first display device 100_1 that Dolby Vision is not supported during a capability negotiation process with the first display device 100_1.

The first display device 100_1 may transmit a second video signal to the second display device 100_2 to which Dolby picture quality is not applied to the source image 1310 being displayed. That is, the second video signal may be a signal in which the values of one or more picture quality factors according to Dolby Vision are not reflected.

The second display device 100_2 may display the second mirroring video 1410 on the display unit 180_2 based on the second video signal in which Dolby Vision is not set.

Since Dolby Vision is not applied to the second mirroring video 1410, the picture quality may be lower than that of the source image 1310. However, compared to the first mirroring video 1330 of FIG. 13, the degree of picture quality deterioration may be much lower.

As such, according to an embodiment of the present disclosure, even if the source device supports Dolby Vision and the sink device does not support Dolby Vision, it is possible to output a stable mirrored video without any disruption.

That is, according to an embodiment of the present disclosure, as the source device and the sink device share whether or not the picture quality setting function is supported, the source device may transmit an appropriate video to the sink device. Accordingly, the sink device may display the mirrored video stably without disruption.

Accordingly, users may watch mirrored video without inconvenience even if the sink device does not support the picture quality setting function.

FIGS. 15A and 15B are diagrams illustrating information included in packet transmitted and received between a first display device and a second display device according to an embodiment of the present disclosure.

In particular, FIGS. 15A and 15B show that when the first display device 100_1 and the second display device 100_2 are connected to the same router, a packet list 1500 including packets transmitted and received the first display device 100_1 and the second display device 100_2 are through the router is shown.

First, in FIG. 15A, it is assumed that the first packet 1510 included in the packet list 1500 is used to set parameter transmitted from the first display device 100_1 to the second display device 100_2, as in step S705 of FIG. 8A.

The first packet 1510 may include picture quality setting information 1530. If it is confirmed that the second display device 100_2 supports the picture quality setting function, the picture quality setting information 1530 may include values of one or more picture quality factors.

The user may analyze the packet received by the router or the second display device 100_2 to check whether picture quality setting information 1530 is included.

According to an embodiment of the present disclosure, if the packet includes picture quality setting information 1530, the second display device 1002 may determine that it supports the picture quality setting function.

According to an embodiment of the present disclosure, if the packet does not include picture quality setting information 1530, the second display device 1002 may determine that the picture quality setting function is not supported.

As another example, according to an embodiment of the present disclosure, when the second display device 1002 supports Dolby Vision, the picture quality setting information 1530 included in the first packet 1510 may include information indicates that Dolby Vision is enabled.

If the second display device 100_2 does not support Dolby Vision, the picture quality setting information 1530 included in the first packet 1510 may include information indicating that Dolby Vision is disabled.

In this way, applicability of the embodiment of the present disclosure may be determined through analysis of packets exchanged between the first display device 100_1 and the second display device 100_2.

In FIG. 15B, it is assumed that the second packet 1540 included in the packet list 1500 is a packet for parameter setting transmitted from the first display device 100_1 to the second display device 100_2, as in step S705 of FIG. 8B.

The second packet 1540 may include picture quality setting information 1550. If it is confirmed that the second display device 1002 supports the picture quality setting function, the picture quality setting information 1550 may include values of one or more picture quality factors.

In particular, the picture quality setting information 1550 included in the second packet 1540 may include set values for brightness, contrast, and sharpness, and unset values for HDR/Dolby Vision.

The user may analyze the packet received by the router or the second display device 100_2 to check whether picture quality setting information 1550 is included.

Through the picture quality setting information 1550, it may be confirmed that the second display device 100_2 requires setting the video signal for some picture quality factors.

In this way, applicability of the embodiment of the present disclosure may be determined through analysis of packets exchanged between the first display device 100_1 and the second display device 100_2.

Figure 16:
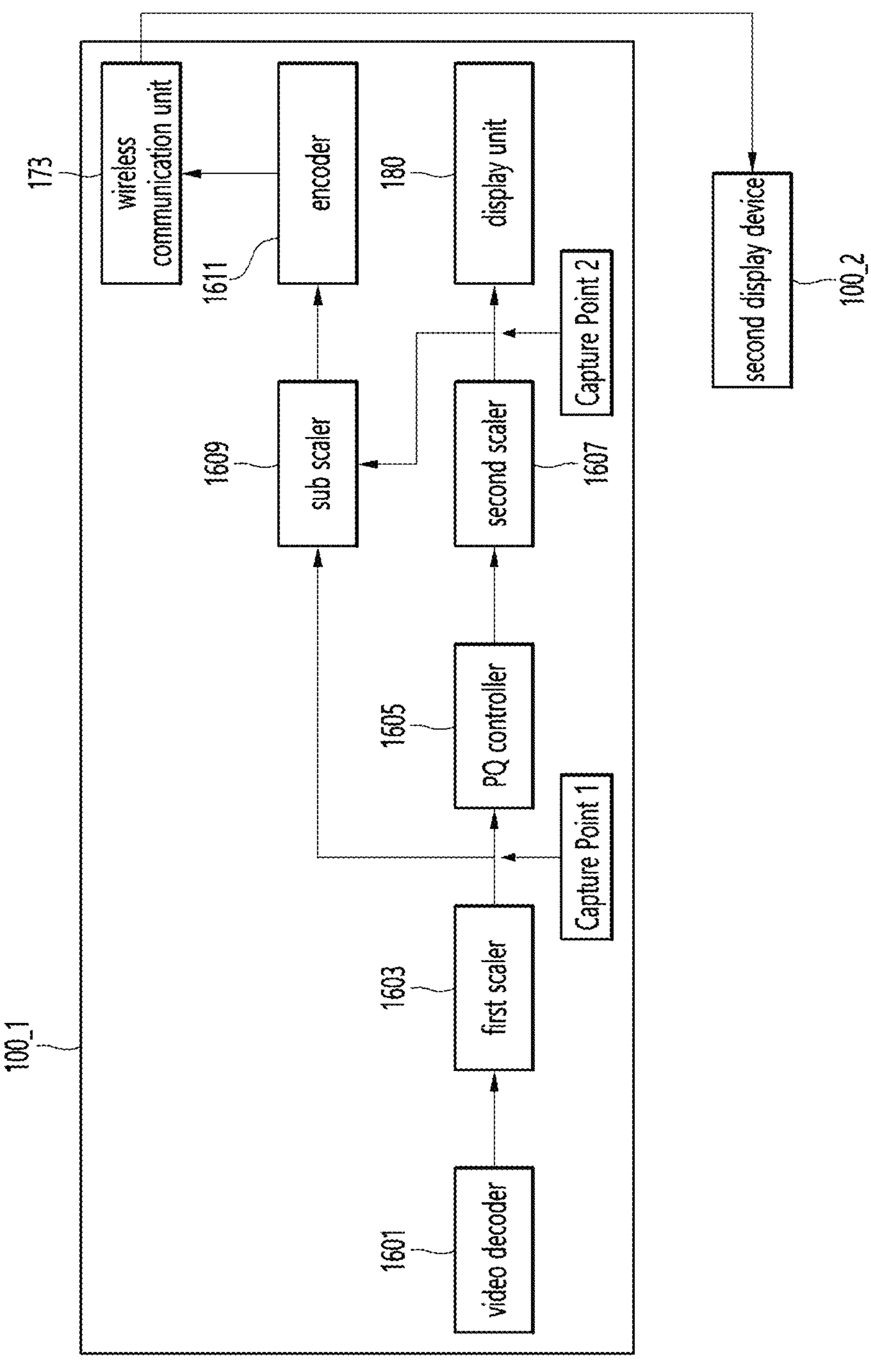
FIG. 16 is a diagram for explaining a method of processing the picture quality of a video transmitted by a first display device depending on whether the second display device supports the picture quality setting function.

FIG. 16 is a diagram for explaining a method of processing the picture quality of a video transmitted by a first display device depending on whether the second display device supports the picture quality setting function.

The first display device 100_1 includes a video decoder 1601, a first scaler 1603, a PQ controller 1605, a second scaler 1607, a sub-scaler 1609, an encoder 1611, and a wireless communication unit 173 and a display unit 180.

The video decoder 1601, the first scaler 1603, the PQ controller 1605, the second scaler 1607, the sub-scaler 1609, and the encoder 1611 may be components included in the control unit 170.

The video decoder 1601 may decode the received video. The video may be a moving image or streaming video.

The first scaler 1603 may perform primary scaling on the decoded video. Primary scaling may be downscaling.

The PQ controller 1605 may process the picture quality of the first scaled image.

Dolby Vision or HDR settings may be performed on the primary scaled image. The PQ controller 1605 may apply the values of one or more picture quality factors for Dolby Vision or HDR to the primary scaled image.

The second scaler 1607 may perform secondary scaling of the picture quality processed by the PQ controller 1605 into a form suitable for output to the display unit 180. Secondary scaling may be upscaling.

The secondary scaled video may be displayed through the display unit 180.

The sub-scaler 1609 may mux the OSD video or UI video to the primary scaled video.

The encoder 1611 may encode the muxed video and transmit the encoded video to the wireless communication unit 173.

The wireless communication unit 173 may transmit the encoded video to the second display device 100_2 according to short-range wireless communication standard.

During the capability negotiation process, if it is confirmed that the second display device 100_2 does not support the picture quality setting function, the video primary scaled through the first scaler 1603 may be transmitted to the sub-scaler 1609.

In other words, <capture point 1> is a point where the picture quality has not been set for the video, and the video captured at this point may not have been picture quality processed.

During the capability negotiation process, if it is confirmed that the second display device 100_2 supports the picture quality setting function, the video first scaled through the first scaler 1603 may be transmitted to the PQ controller 1605.

A video whose quality is set through the PQ controller 1605 may be upscaled through the second scaler 1607.

<capture point 2> is the point where the picture quality is set for the video, and the video captured at this point may have been quality processed.

The quality-processed video may be muxed with the OSD video or UI video through the sub-scaler 1609 and encoded.

In this way, depending on whether the second display device 1002 supports the picture quality setting function, the first display device 100_1 may or may not perform picture quality processing of the image.

Through the capture result of the video signal at each point of <capture point 1>, <capture point 2>, it may be determined whether the picture quality is set or not.

Embodiments of the present invention may be supported by in standard documents disclosed in at least one of the wireless access systems: IEEE 802 system, 3GPP system, 3GPP LTE and LTE-A (LTE-Advanced) system, 3GPP2 system, and Wi-Fi Alliance (WFA) system. That is, among the embodiments of the present invention, steps or parts not described in order to clearly reveal the technical idea of the present invention may be supported by the above documents. Additionally, all terms disclosed in this document may be explained by the standard document.

According to an embodiment of the present invention, the above-described method may be implemented as processor-readable code on a program-recorded medium. Examples of media that the processor may read include ROM, RAM, CD-ROM, magnetic tape, floppy disk, and optical data storage device.

The display device described above is not limited to the configuration and method of the above-described embodiments, and the embodiments may be configured by selectively combining all or part of each embodiment so that various modifications may be made.

The invention claimed is:

1. A wireless device that provides a screen sharing service with an external device, the wireless device comprising:

a wireless transceiver;

a display; and a processor configured to control the display and the wireless transceiver, wherein the processor is further configured to:

receive, from the external device, a first video signal corresponding to a source video being displayed by the external device, display a first mirrored video based on the first video signal, receive, from the external device, a first message inquiring whether the wireless device can support a specific picture quality setting for the source video being displayed by the external device, wherein the specific picture quality setting is selected from among a plurality of picture quality factors including brightness, contrast, sharpness, HDR, and Dolby Vision, and in response to the first message, transmit, to the external device, a second message including a response as to whether the specific picture quality setting is supported by the wireless device, wherein the second message includes a picture quality setting function support field having a first field value indicating that the specific picture quality setting is supported by the wireless device and a second field value indicating that the specific picture quality setting is not supported by the wireless device, wherein, when the second message includes the second field value indicating that the specific picture quality setting is not supported, the processor configured to receive, from the external device, a second video signal that was not processed with the specific picture quality setting at a picture quality controller of the external device, and to receive a first packet for parameter setting from the external device that does not include values of one or more picture quality factors for the specific picture quality setting, and wherein, when the second message includes the first field value indicating that the specific picture quality setting is supported, the processor is configured to receive, from the external device, a third video signal that was processed with the specific picture quality setting at the picture quality controller of the external device, and to receive a second packet for parameter setting from the external device that includes values of the one or more picture quality factors for the specific picture quality setting.

2. The wireless device of claim 1, wherein:

the first message is transmitted during a capability negotiation phase prior to establishment of a Wi-Fi Direct (WFD) session between the wireless device and the external device, and the first message comprises a GET_PARAMETER message according to a Real-Time Streaming Protocol (RTSP).

3. The wireless device of claim 2, wherein the second message comprises a response to the GET PARAMETER message according to the RTSP, and the picture quality setting function support field is identified by a wfd_lg_video_setting field in the second message.

4. The wireless device of claim 2, wherein:

the second packet includes a SET PARAMETER message according to the RTSP, the SET PARAMETER message includes the picture quality setting function support field with specific values for each of the one or more picture quality factors, and the processor is further configured to apply the specific values to the third video signal to display a third mirrored video.

5. The wireless device of claim 1, wherein each of the plurality of picture quality factors has an individual support indicator in the picture quality setting function support field, and the second field value indicates that at least one of the plurality of picture quality factors is not supported while at least one other of the plurality of picture quality factors is supported by the wireless device.

6. The wireless device of claim 1, wherein the second video signal is captured at a first capture point in a video processing pipeline of the external device before a picture quality (PQ) controller of the external device, and the third video signal is captured at a second capture point in the video processing pipeline of the external device after the PQ controller of the external device.

7. The wireless device of claim 6, wherein:

when the second message includes the second field value, the external device bypasses the PQ controller in the video processing pipeline to generate the second video signal without applying the specific picture quality setting, and when the second message includes the first field value, the external device processes the source video through the PQ controller in the video processing pipeline to generate the third video signal with the specific picture quality setting applied.

8. An external device in a wireless display system including the external device and a wireless device, the external device comprising:

a wireless transceiver;

a display; and a processor configured to control the display and the wireless transceiver, wherein the processor is configured to:

display a source video, transmit, to the wireless device, a first video signal corresponding to the source video being displayed by the external device so as to cause the wireless device to display a first mirrored video based on the first video signal, transmit a first message to the wireless device inquiring whether the wireless device can support a specific picture quality setting for the source video being displayed by the external device, wherein the specific picture quality setting is selected from among a plurality of picture quality factors including brightness, contrast, sharpness, HDR, and Dolby Vision, in response to the first message, receive, from the wireless device, a second message including a response as to whether the specific picture quality setting is supported by the wireless device, wherein the second message includes a picture quality setting function support field having a first field value indicating that the specific picture quality setting is supported by the wireless device and a second field value indicating that the specific picture quality setting is not supported by the wireless device, wherein, when the second message includes the second field value indicating that the specific picture quality setting is not supported, the processor configured to receive, from the external device, a second video signal that was not processed with the specific picture quality setting at a picture quality controller of the external device, and to receive a first packet for parameter setting from the external device that does not include values of one or more picture quality factors for the specific picture quality setting, and wherein, when the second message includes the first field value indicating that the specific picture quality setting is supported, the processor is configured to receive, from the external device, a third video signal that was processed with the specific picture quality setting at the picture quality controller of the external device, and to receive a second packet for parameter setting from the external device that includes values of the one or more picture quality factors for the specific picture quality setting.

* * * * *